Jan. 14, 1930.  J. B. ARMITAGE ET AL  1,743,649
SPEED CHANGE MECHANISM
Filed March 15, 1926  6 Sheets-Sheet 1

INVENTORS
Joseph B Armitage
Fred G Parsons
BY
Fred G Parsons
ATTORNEY

Patented Jan. 14, 1930

1,743,649

UNITED STATES PATENT OFFICE

JOSEPH B. ARMITAGE AND FRED A. PARSONS, OF MILWAUKEE, WISCONSIN, ASSIGNORS TO KEARNEY & TRECKER CORPORATION, OF WEST ALLIS, WISCONSIN

SPEED CHANGE MECHANISM

Application filed March 15, 1926. Serial No. 94,876.

This invention relates to improvements in speed changing mechanism. The invention is particularly adapted to meet the requirements of a shifting mechanism for controlling the change speed transmission mechanism of machine tools such as milling machines.

This application is a companion to application Serial No. 52189, filed August 24, 1925, which matured into Patent No. 1,715,488 and in general the objects of the invention and the devices whereby selection and shifting of selected speed change elements are ultimately accomplished may be assumed for the purpose of the present invention to be essentially the same as those disclosed in the above mentioned companion application. The present invention relates specifically to a novel and improved set of motion transmitting connections for transmitting selective and shifting movements to the parts which perform these respective functions.

It is the primary purpose of the present invention to provide novel and improved means for uniting the selection and shifting controls in a single manually operable part so mounted as to have distinct and separate movements in the performance of its several functions.

It is also the object of the invention to provide a compensating mechanism which operates as a cross connection between the parts which control selection and shifting functions in such a manner as to prevent angular displacement of certain of these parts during the movement of others of these parts.

It is a further object to provide an interlock for securing the hand lever against certain movements under certain circumstances having to do with the relative positions of the several parts controlled thereby.

It is a further object to provide a unitary construction in the mechanism for accomplishing other objects of this invention particularly adapted for convenient bodily removal and to provide access to other machine tool parts.

In the drawings.

Like parts are identified by the same reference characters throughout the several views.

Figure 1:
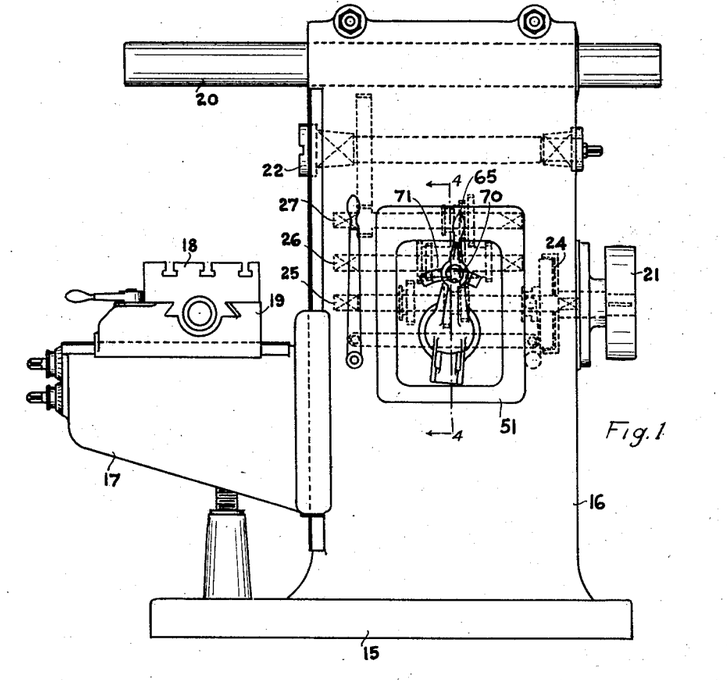
Fig. 1 is a side elevation of a milling machine equipped with an embodiment of this invention.
Figure 2:
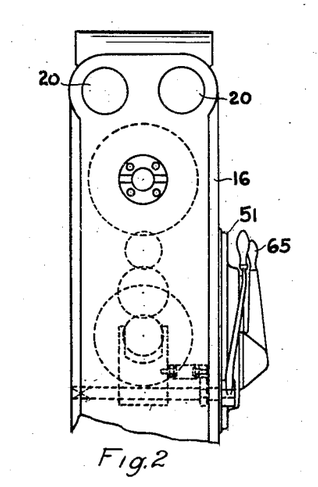
Fig. 2 is a fragmental front elevation of the column of a machine so equipped.
Figure 3:
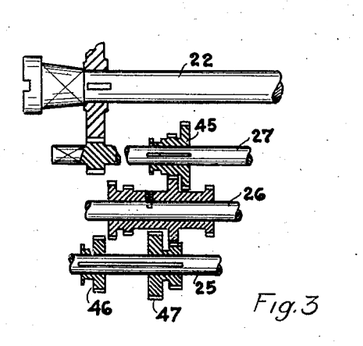
Fig. 3 is a detail view shown diagrammatically in side elevation the gear train which incorporates the shiftable gears selected and actuated by the mechanism of this invention.

The milling machine to which the invention is applied in the accompanying drawings will be understood to be representative of standard machine tools, to which the invention is peculiarly adapted. The milling machine is of the conventional knee and column type in that it embodies a base 15, a hollow column or housing 16, and a knee 17 vertically adjustable upon the column and carrying a table 18 through the intermediation of saddle 19. Overarms are provided at 20. To avoid confusion many of the parts of the standard milling machine which are unnecessary to illustrate this invention have been omitted from the drawings, such parts being well known. The invention is applied in this instance to control the transmission of power between the pulley 21 (which is the source of power for the machine) and spindle 22 which represents the driven member. Pulley 21 is connected through a clutch mechanism 24 with the first of a set of three transmission shafts 25, 26, and 27. Shaft 27 is gear connected with spindle shaft 22, as shown in Fig. 3, and the gear sets which it is the purpose of this invention to control, are disposed on the three shafts 25, 26, and 27. The gear set on shaft 26 is illustrated as being fixed, and only the gears on shafts 25 and 27 are shown as being shiftable.

The various gear pairs are of different ratio, and as the different pairs become operative to transmit power different speeds are transmitted, the mechanism thus constituting a speed or rate change device including shiftable elements whose position is determinative of the speed produced.

Figure 8:
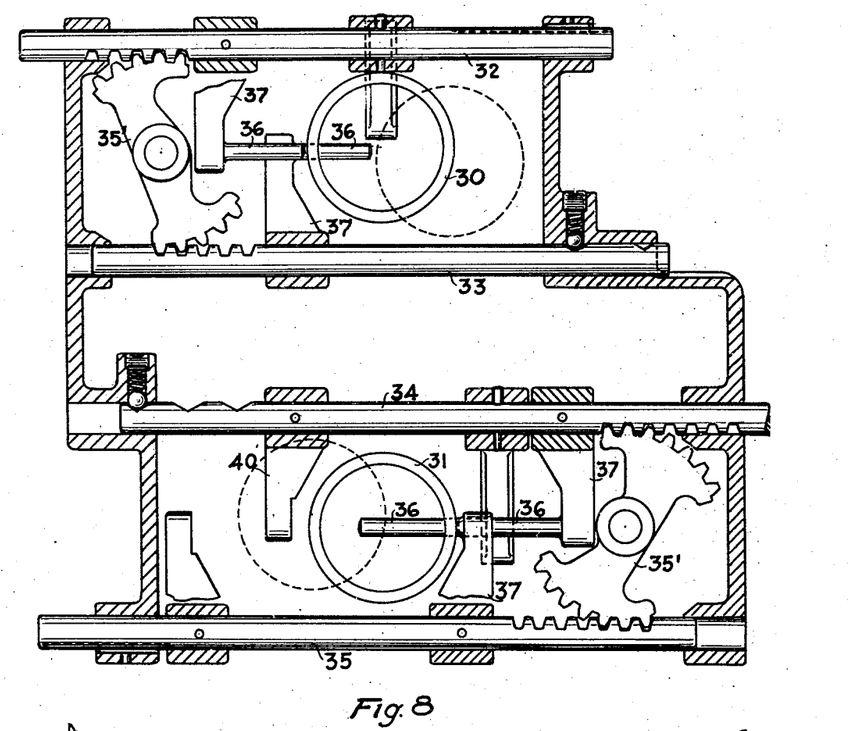
Fig. 8 is a detail view taken on the section indicated at 8—8 in Fig. 4.
Figure 9:
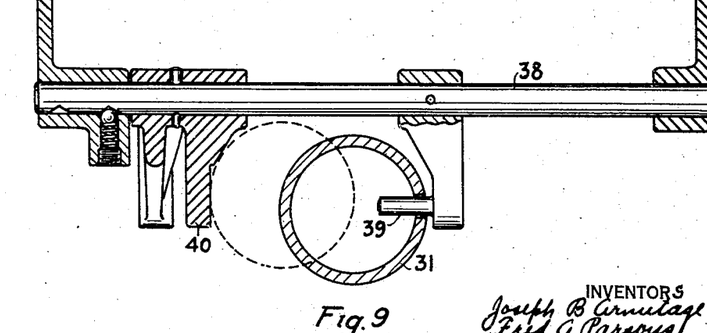
Fig. 9 is a detail view taken on the section indicated at 9—9 in Fig. 4.

The means by which the shiftable rate change elements are selected and shifted to establish any desired combination through the train just described was disclosed in detail in the companion application above referred to. A very brief summary, however, of the function of this selecting and shifting device will be given here in order to facilitate an understanding of the present invention. Reference is made to Figs. 8 and 9 in conjunction with Fig. 4.

For the purpose of selecting and subsequently shifting the speed change elements necessary to produce a desired speed, members are provided in the form of hollow drums or selector members 30 and 31 which, for the purposes of selection of speed change elements to be shifted, are so mounted as to be rotatable upon their own axes, and for the purposes of shifting or actuating the selected elements into positions productive of a desired speed, are so mounted as to be oscillatory about a center intermediate their axes. The limits of oscillation of drums 30 and 31 about the intermediate center are represented by the positions illustrated in full and dotted lines, respectively, in Fig. 8. The manner in which the drums are thus mounted for selective and shifting movements will hereinafter be more particularly described.

Drums 30 and 31 have apertured peripheries, the openings being arranged in a predetermined pattern. Above and below each drum are reciprocable rods arranged in pairs, rods 32 and 33 being associated with drum 30 and rods 34 and 35 with drum 31. The rods of each pair are interconnected by segments 35' for opposite movement. Pins such as those shown at 36 are supported in a horizontal plane between each pair of rods and are carried by arms such as those shown at 37 from the one or the other of the rods. The arrangement is such that during the movement of drums 30 and 31 from their dotted line positions to their full line positions they may either receive given pins 36 into apertures in their peripheries or may abut such pins to produce a predetermined reciprocation of the rods thereabove and therebeneath. The pattern of the openings in the periphery of the respective drums and the angular positions of such drums in rotation upon their respective axes will obviously be determinative of the pins which the drums will encounter during their oscillatory movement and consequently will be determinative of the direction and extent of movement of the rods 32 and 33. An additional rod 38 placed beside rod 34 requires only a more limited movement and consequently carries a shorter pin 39 and utilizes the arm 40 depending in the path of the returning drum to restore it to a neutral position subsequent to each occasion upon which it has been shifted by the drum.

It will be obvious that rods 32 and 34 are restored to their original or neutral positions only by the opposite movement of rods 33 or 35, respectively, and consequently are not readjusted upon each operation of the shifter but only upon such occasions as their readjustment is required for the next selected combination of gears.

These two arrangements, which were described in detail in the companion application above referred to, have only been mentioned sufficiently in the above paragraphs to indicate the two different ways in which the bodily movement of the drums operates to change the positions of rods 32, either by the direct action of the drum upon an arm depending from the rod which received the movement or else by the action of the drum through an arm carried by another rod interconnected to produce an opposite movement in the rod of which adjustment is required.

Shifting forks 42, 43, and 44 are carried respectively by the shiftable rods 32, 34, and 38 and are operatively connected respectively with the gear sets 45, 46, and 47. It will be obvious from the foregoing brief explanation that the drums 30 may be rotated to select any desired combination of gears to be shifted and to predetermine the direction of movement thereof, and that the subsequent bodily oscillatory movement of the drums will effect the desired shifting of the gears by selectively abutting certain of the pins 36 while admitting others of the pins through the apertures provided in the periphery of the respective drums for that purpose.

Having now described the mechanism requiring operation, we will now proceed to set forth in detail the motion transmitting connections whereby these desired movements are achieved.

In the side wall of the hollow column 16 is an opening 50 which is preferably sufficiently large to permit the unitary insertion and withdrawal of the entire gear shifting assembly. The mechanism hereinafter to be described can conveniently be supported and assembled upon a closure plate 51 for this opening, reference being made particularly to Figs. 4 and 5. A stud shaft 52 supports for oscillation the carrier or frame 53 which carries drums 30 and 31. The respective drums are each fixed to short lengths of shaft 54 journaled in the ends of the swinging frame 53 and carrying respectively the pinions 55 and 56 clamped thereto.

Pinions 55 and 56 are each engaged with a central gear 58 having a hub portion 59 journaled upon bearing member 53. The hub 59 also carries a smaller gear 60 with which segment 61 meshes (see Fig. 6). The arrangement is such that in any position of oscillation of the carrier 53 the drums will always be subject to rotation upon their respective axes through the operation of segment 61, gear 60, gear 58 and pinions 55 and 56.

Having now described how the drums 30 and 31 are supported for bodily oscillation about the center represented by the axis of stud shaft 52 and for rotation about their respective axes, we will now disclose the arrangement whereby these shifting and selective movements may be effected through distinct and separate adjustments of a single manual control. For the purposes of the disclosure the single manually operable control takes the form of a hand lever 65 which is oscillatable from side to side for the purpose of the selective or rotative movement of the drums 30 and 31 and is oscillated toward and from the machine tool column for the purposes of adjusting the carrier 53 from its retracted to its advanced positions. Hand lever 65 is fulcrumed at 66 upon an arm 67 carried by a rotary annulus 68 journaled in an opening in the closure plate 51. A pointer 69 carried by annulus 68 is projected upwardly to a point immediately behind an opening 70 in the handle. This opening frames a portion of a segmental indexing plate 71 to which pointer 69 is directed. As pointed out in the companion application above referred to, the use of drums 30 and 31 for accomplishing the selection and shifting of elements in a complex gear train has the advantage that it is possible to arrange the control mechanism so that the index pointer will move naturally across an indexing plate on which a multiplicity of speeds can be listed consecutively.

Within the annulus 68 is journaled the hub 75 of segment 61. A cam sleeve 76 within hub 75 is pivoted by means of the pins 76' to the handle so that the sleeve 76 is not only forced to rotate with the handle but may also be caused by the handle to reciprocate axially in accordance with the oscillatory movements of the handle about its fulcrum at 66. The shaft 77 passes through sleeve 76 and is shouldered at 78 for engagement with the end of the sleeve. A nut 79 threaded to its reduced extremity engages the sleeve at the outer end so that the sleeve 76 is confined against axial movement with respect to shaft 77 but relative rotative movement may occur between these parts.

Figures 6, 7, 10:
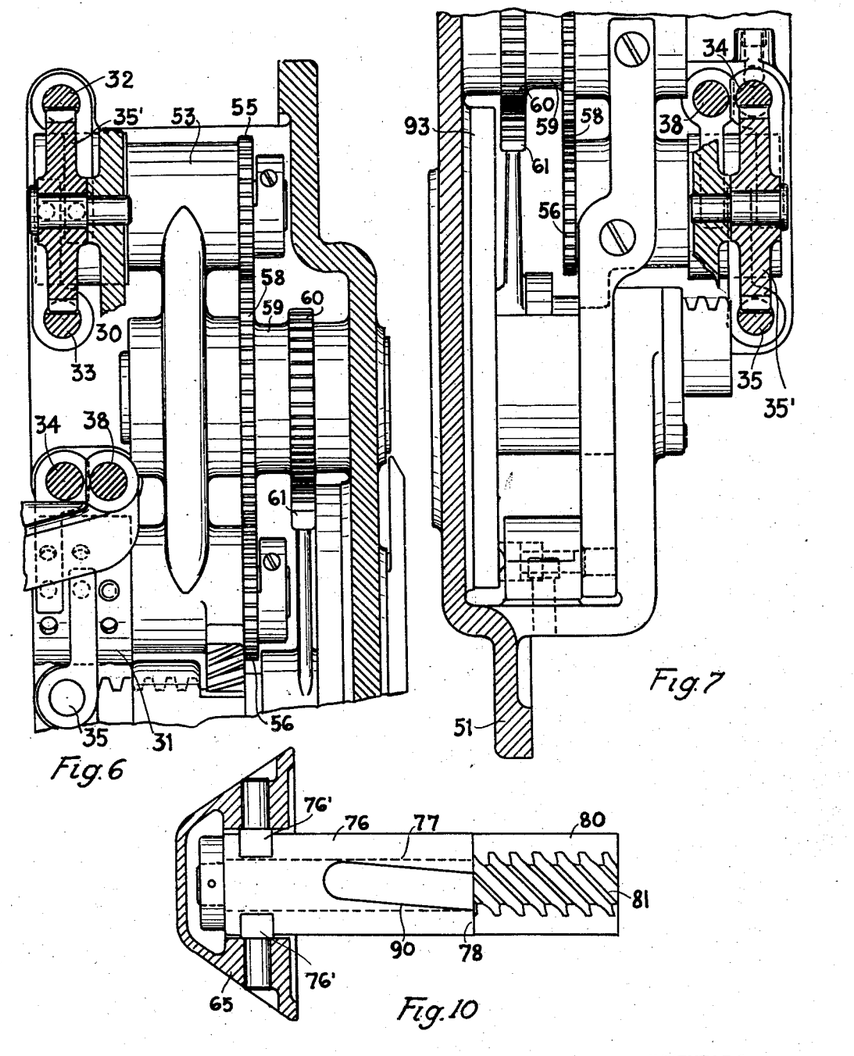
Fig. 6 is a detail view taken on the section line indicated at 6—6 in Fig. 5.
Fig. 7 is a detail view taken on the line indicated at 7—7 in Fig. 5.
Fig. 10 is a detail view taken on the section indicated at 10—10 in Fig. 4.
Figure 11:
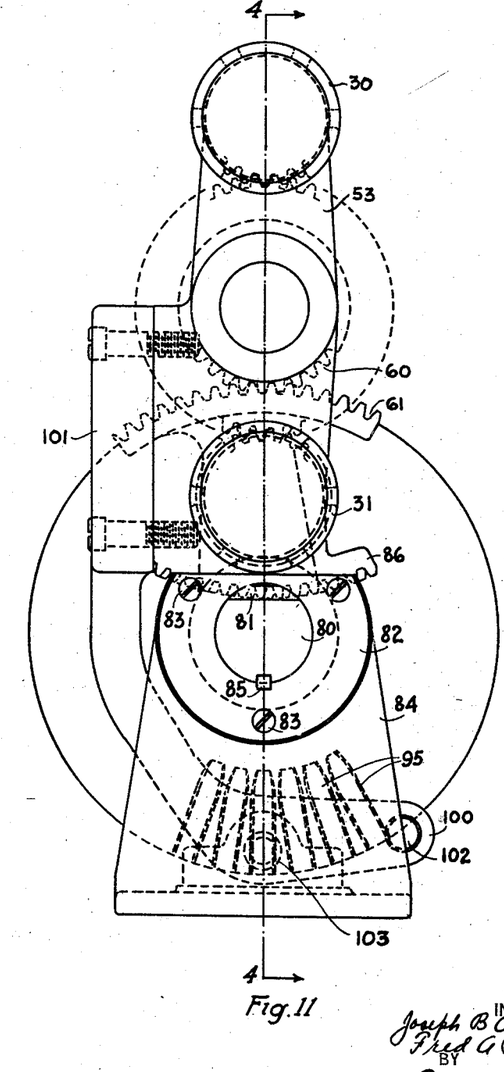
Fig. 11 is a detail view in rear elevation of the oscillatable bracket which carries the selecting and shifting drums showing such bracket in its relation to its mounting and to the controlling connections.

Shoulder 78 is formed by the provision on the inner end of shaft 77 of an enlarged head member 80 which is provided with diagonally disposed segmental gear teeth 81 formed in an otherwise flattened upper surface, as best shown in Figs. 10 and 11. This head member is reciprocable through a removable cap plate 82 secured by screws 83 to the relatively fixed arm 84 which projects rearwardly and upwardly from the closure plate 51 upon which the entire operating mechanism is assembled. A suitable key is provided at 85 to connect the toothed head 80 with cap plate 82 and thereby to restrain the head from rotation while permitting it a splined axial movement. A segment 86 on the lower end of the drum carrying frame 53 meshes with teeth 81 of head 80 to receive movement therefrom. Thereby the oscillation of the hand lever 65 to and from the column of the machine is transmitted through pins 76', sleeve 76, shoulder 78, head 80, gear teeth 81 and segment 86 to the carrier to oscillate the carrier in such manner as to move the drums bodily in a shifting direction between their full line and dotted line position, as indicated in Fig. 9.

When the carrier is in its retracted position of adjustment, as where the drums are in the dotted line positions above referred to, it is possible to rotate the drums on their own axes for purposes of selection. This is accomplished by rotation of the handle about the axis of shaft 77. The motion is transmitted from the handle through pins 76' to the cam sleeve 76. This sleeve is provided in its upper surface with a cam groove 90, best shown in Figs. 4 and 10, and formed in a generally longitudinal direction but slightly inclined away from a radial plane including the axis of said sleeve. The cam follower 91 may take the form of an ordinary cap screw and acts purely as a key to transmit the rotative movement of cam sleeve 76 to the hub 75 of gear segment 61 whence, through mechanism already described, the drums 30 and 31 are caused to rotate upon their axes.

It is to be noted that in the mechanism described above certain portions, for instance the rotary annulus 68 and segment 61 have movement which is purely selective, other portions, for instance the carrier 53 have movement which is purely for the actuation or shifting of the selected speed change members, while other portions, for instance the drums 30 and 31 have both movements, as does also the handle 65.

It is particularly to be noted that not only does the cam follower 91 serve as a key to transmit the oscillatory selective movement of handle 65 to the drums, but in addition, due to the inclination of cam groove 90, the sides of such groove will act upon the cam follower 91 to move the segment 86 in the course of the outward oscillation of handle 65. The purpose of such construction may be explained as follows. During the arcuate bodily movement of either drum from its dotted to its full line position (Fig. 8) owing to the gear connection of the drum with the segment 86, the drum would, unless prevented, revolve slightly on its own axis, and a given drum aperture would thereby be moved transversely relative to the shifter pin which it receives, making it necessary to circumferentially elongate the drum apertures to prevent striking or binding the pin. Also in the arrangement here shown the drum bodily changes its position relative to the plane in which the pin moves and this movement would unless prevented cause a given drum aperture to be moved transversely relative to the shifter pin. In the present instance the one movement helps to correct the other whereby even if no compensating device were used it would not be necessary to enlarge the pin apertures unduly, but it is desirable to compensate entirely or substantially so for the algebraic sum of both such movements to avoid any enlargement of the pin apertures and to avoid frictional resistance caused by the surface of the drum moving transversely against the end of pins for which there is no aperture at a given selective adjustment of the drum.

The angularity of the cam groove 90 moves the segment 86 during movement of the carrier a sufficient amount to maintain the drum surface presented toward pins 36 in a substantially constant or fixed plane, or in other words to compensate for the undesired movements mentioned.

An exact compensation for the change in horizontal drum plane would require a cam groove of increasing angularity toward the one end, but such a degree of refinement is unnecessary, it being sufficient if the total compensating movement is approximately correct.

In order that all control movements may be quickly and easily effected, the system of controls herein disclosed is so organized as to give considerable leverage to an operator grasping the handle 65. It will be obvious that pins 36 which are acted upon by the drums for gear shifting purposes have not great strength and might be damaged if any attempt were made to adjust the drums in a selective or rotative direction at a time when the drums were in their advanced or full line positions, as shown in Fig. 8, so that certain of the pins would at such times be received into apertures in the drums.

Figure 4:
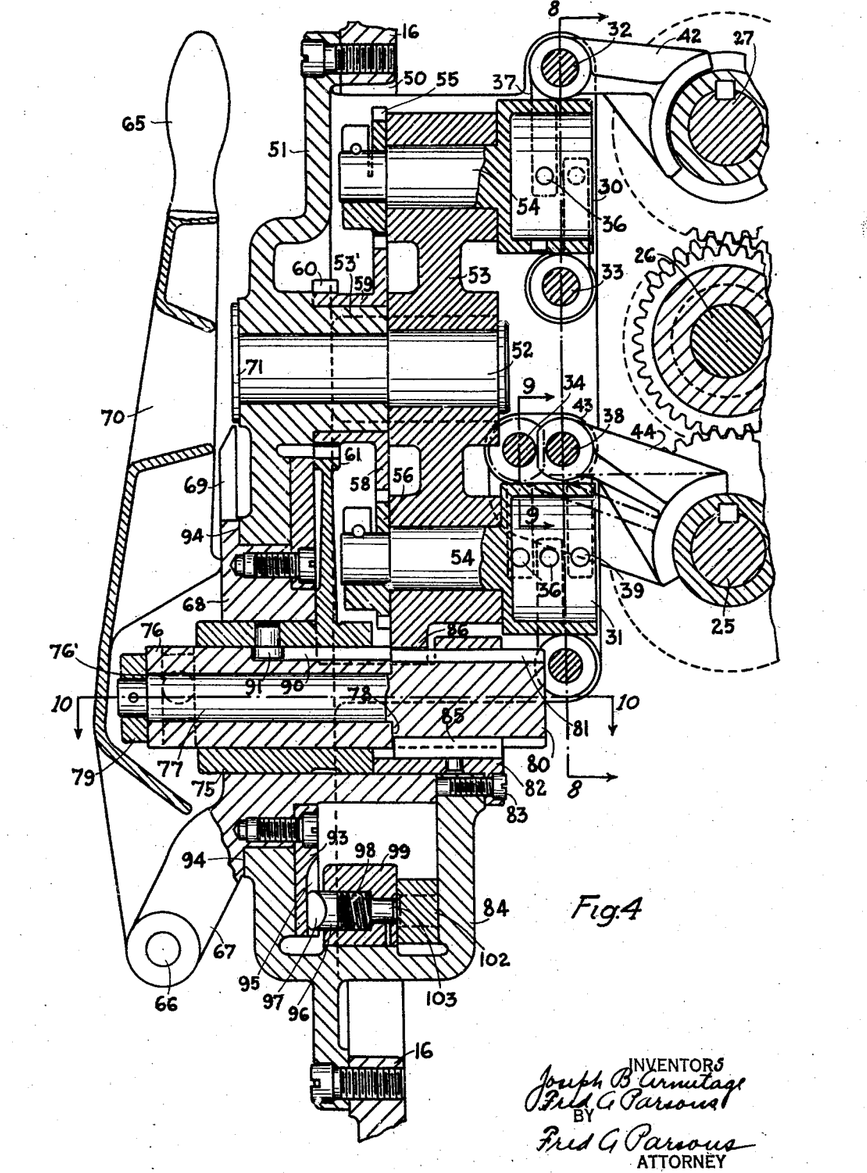
Fig. 4 is a vertical transverse section on an enlarged scale through the wall of the machine tool column in the plane indicated at 4—4 in Figs. 1, 5, and 18.
Figure 5:
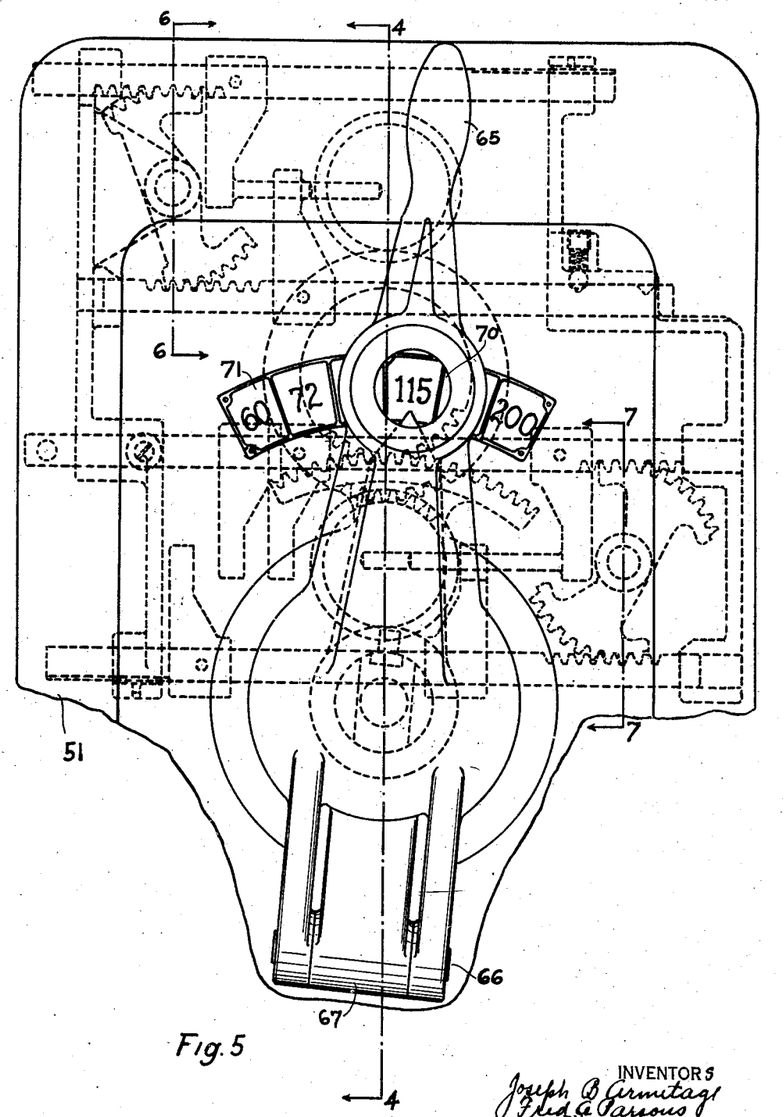
Fig. 5 is a view in side elevation of the parts shown in Fig. 4.

By way of an interlock to protect the mechanism against injury under such circumstances, we have provided the apparatus best shown in Figs. 4 and 11.

The disk 93 is screwed to the rotary annulus 68 and cooperates with shoulder 94 of such annulus in engaging closure plate 51 and thereby fixing the position of said annulus. This disk is provided in that portion of its surface which is normally lowermost with a series of substantially radial notches 95 shown in dotted lines in Fig. 11. A plunger 96 with a beveled end 97 is receivable into the grooves 95 under the pressure of a spring 98. The plunger is guided for reciprocation in the relatively fixed block 99.

Between the rear face of block 99 and the upwardly extending portion of fixed arm 84 is a movable arm 100 depending from a plate 101 bolted to the side of the carrier, as shown in Fig. 11. Arm 100 is provided with a socket 102 adapted to receive the rear end 103 of plunger 96. The length of the plunger is such that its rear end portion 103 will not enter socket 102 when the beveled end 97 of the plunger is engaged in one of the grooves 95. The grooves 95 correspond in number to the various operative positions of selective adjustment of handle 65, and therefore it is possible whenever the handle is in any particular position of selective adjustment to push the handle inwardly toward the column in its gear shifting adjustment, whereby to cause a bodily translative movement of the drums. It is not possible, however, thus to shift the gear elements unless the handle has a proper selective adjustment.

It will be noted, furthermore, that it will be impossible for the plunger to leave any grooves 95 unless the socket 102 is in registry with the plunger. At all other times the plunger will be backed up by an unsocketed plane surface at the forward side of arm 100. Thus, it becomes possible to move handle 65 in a selective direction of oscillation only upon such occasions as the socket 102 registers with the end 103 of the plunger, and the arrangement is such that in this position of the parts the drums will be in their retracted positions and none of the pins will be projected through apertures in the drums. In Fig. 11 the drums are illustrated in their advanced positions, and accordingly, the apertures or socket 102 does not register with the plunger 103, and before the handle 65 can be oscillated parallel to the adjacent side surface in the column it will be necessary first to draw the handle away from the column to retract the drums and, by the retractive oscillation of carrier 53, to bring the socket 102 ito registry with plunger 98.

Those skilled in the art will appreciate from the disclosure herein that the objects of the invention are fully satisfied and that we have not only provided a simple, convenient, and directly acting mechanism for utilizing a single hand lever for the purposes of the selection and shifting of speed changing elements, but that we have also provided in simple manner for a compensatory rotative movement of the drums during the shifting operation, and we have further suggested numerous mechanisms which have the advantages and functions pointed out in the course of the description.

Notably, we have provided for an interlock between the selective and shifting portions of the device to prevent injury to the parts such as might occur if the operations could be conducted in improper sequence; we have provided an extremely compact device unitarily mounted for removal and replacement upon a closure plate fitted to an opening in a housing of the machine tool, which opening when the device is removed provides access to the interior mechanism; we have provided a selecting and actuating mechanism operative from a single handle, and an indicating means associated therewith in a manner to operate only from the movement of selection; we have provided compensating means operative on an adjustable translatable selective mechanism to maintain a portion substantially in a fixed plane of movement.

These and other results individually and in combination have all been accomplished in an improved and simplified manner particularly adapted for machine tools.

It is apparent that the particular embodiment of the invention herein disclosed may be modified into a variety of equivalent forms each of which it is desired to protect in accordance with the spirit and scope of the accompanying claims, in which such invention is clearly pointed out.

We claim:

1. In a device for the selective shifting of speed change elements, the combination with a movable carrier and a selector carried thereby, of a first member connected with said carrier and operative to transmit movement thereto, a second member connected to said selector and adapted to transmit movement thereto, a part mounted for rotatable and reciprocal movements and adapted to transmit said movements independently to said members, and a handle connected with said part and operative to produce either of said movements therein.

2. The combination of a speed change mechanism including an adjustable selector and a carrier therefor, concentric members connected respectively with said selector and carrier to transmit motion thereto, and a handle operatively connected to impart movement to both of said members and selectively adjustable to move either in a direction to impart motion to its respective part of said mechanism.

3. In a device of the character described, the combination with a movable carrier and a selector carried thereby, said carrier and selector being organized for selective shifting of speed changing elements, of a first member connected with said carrier and operative to transmit movement thereto, a second member connected to said selector and adapted to transmit movement thereto, a part mounted for rotatable and reciprocal movements and adapted to transmit said movements independently to said members, and a handle connected with said part and operative to produce either of said movements therein, said handle being oscillatable about the axis of said part and fixed to said part to transmit rotative movement thereto and being also oscillatable about another axis transverse to the axis of said part and spaced therefrom, whereby to be adapted to transmit reciprocal movement to said part.

4. In combination, an actuating carrier supported for oscillation, a selector adjustably mounted thereon, a segment connected with said carrier and provided with teeth, a member reciprocable transversely of the path of oscillation of said segment and provided with teeth meshing with the teeth thereof, a sleeve secured against axial movement with respect to said member and rotatable thereon, an arm supported for rotation with said sleeve, a handle pivoted to said arm and to said sleeve, whereby to be adapted to transmit rotative reciprocative movement to said sleeve, and a motion transmission train operatively connecting said selector with said sleeve to receive rotative motion therefrom, together with an indicating pointer partaking of the rotative movement of the sleeve but not of the reciprocal movement thereof, and a relatively fixed scale associated with said pointer.

5. In a device of the character described, the combination with a carrier mounted for adjustment in an actuating direction and a selector mounted thereon to partake of the movement thereof in said direction and supported for an independent selective movement, said carrier and selector being arranged to function in a gear selecting and shifting device, of a toothed segment on said carrier, a member provided with a toothed head meshing with said segment, a sleeve rotatable on said member and abutting said head, means confining said head against axial movement from abutment with said head relative to said member, a gear concentric with the axis of oscillation of said carrier, a gear connected with said selector and meshing with said first mentioned gear, a motion transmitting connection between said sleeve and said first mentioned gear arranged to impart to said first mentioned gear the rotation of said sleeve, an oppositely extending arm and pointer connected to partake of the rotation of said sleeve, and a handle pivoted to said arm and to said sleeve, whereby to be adapted to rotate said sleeve and said pointer and to be movable to and from said pointer in a direction productive of reciprocation of said sleeve member.

6. The combination with a shifting device including a member supported for selective movement and a portion supported for shifting movement between advanced and retracted positions, of a first part movable in accordance with the movement of said portion, a second part movable in accordance with the position of selective movement of said member, both of said parts being provided with recesses and an interlocking device comprising a reciprocable element alternatively receivable into a recess of the one or the other of said parts, said element being relatively immovable in the direction of movement of said parts and adapted to restrain against operation the part in whose recess it is received.

7. The combination of a shifting device including a first member having selective adjustment and a second member movable between advanced and retracted positions, a first part movable in accordance with the movement of said first member, a second part movable in accordance with the movement of said second member, both of said parts being provided with recesses, and an interlocking device comprising a reciprocable element having portions alternatively receivable into a recess of the one or the other of said parts, said element being relatively immovable in the direction of movement of said parts and adapted to restrain against operation the part in whose recess it is received, said first part being provided with a plurality of recesses corresponding with the selective positions of said first member whereby said second member will be subject to movement in any one of such selective positions.

8. The combination of a shifting device including a first member having selective adjustment and a second member movable between advanced and retracted positions, a first part movable in accordance with the movement of said first member, a second part movable in accordance with the movement of said second member, both of said parts being provided with recesses, and an interlocking device comprising a reciprocable element alternatively receivable into a recess of one or the other of said parts, said element being relatively immovable in the direction of movement of said parts and adapted to restrain against operation the part in whose recess it is received, said second part being provided with a recess for registry with said element in a retracted position of said second member only, whereby first member will be restrained against selective rotation except in a retracted position of the second member.

9. Gear shifting mechanism comprising in combination an oscillatory carrier, a member mounted on said carrier for bodily translation therewith between retracted and advanced positions and rotatable for selection, a rotor provided with a plurality of recesses spaced in the direction of its rotation and connected to partake of the rotative movement of said member, an arm connected with said carrier and projecting in substantial parallelism with the recessed face of said rotor, said arm being likewise provided with a recess, a transversely reciprocable plunger serving to interlock said arm and rotor and provided with portions receivable in the recesses thereof, said plunger being of a length such as to project into the recess of one or the other and secured against movement in the direction of movement of the recessed portions of said arm and rotor, the recesses in said arm being adapted to register with and receive said plunger only in the retracted position of said member and the recesses in said rotor being adapted to register with said plunger in each of a plurality of predetermined operative positions of selection of said member.

10. Gear shifting mechanism comprising in combination an oscillatory carrier, a member mounted on said carrier for bodily translation therewith between retracted and advanced positions and rotatable for selection, a rotor provided with a plurality of recesses spaced in the direction of its rotation and connected to partake of the rotative movement of said member, an arm connected with said carrier and projecting in substantial parallelism with the recessed face of said rotor, said arm being likewise provided with a recess, a transversely reciprocable plunger serving to interlock said arm and rotor and provided with portions receivable in the recesses thereof, said plunger being of a length such as to project into the recess of one or the other and secured against movement in the direction of movement of the recessed portions of said arm and rotor, the recess in said arm being adapted to register with and receive said plunger only in the retracted position of said member and the recesses in said rotor being adapted to register with said plunger in each of a plurality of predetermined operative positions of selection of said member, together with a single lever operatively connected with said carrier and said member and adapted to produce oscillatory and rotative movements thereof respectively, whereby said lever is restrained against movement in a direction to produce a selective adjustment of said member at such times as said member is in an advanced position and is restrained against movement in a direction to produce a translative adjustment of said member except at such times as said member is in one of its predetermined positions of selective rotation.

11. In a device of the character described, the combination with a selector mounted for rotative and arcuate bodily movement, of means for compensating said selector against movement of a certain portion thereof from a fixed plane during such bodily movement.

12. In a device of the character described, the combination with a selector mounted for rotative and arcuate bodily movement, of a handle having different motion transmitting connection with said selector for the respective of said movements, and a compensating device interconnected with said motion transmitting connections to prevent movement of a certain portion of said selector from a fixed plane during bodily movement thereof.

13. In a shifting mechanism, the combination with a selector mounted for rotation and a carrier supporting said selector for arcuate bodily movement, of driving connections for said carrier, and compensating mechanism operatively arranged to receive motion from said connections and adapted to maintain a certain portion of said carrier in a fixed plane during such bodily movement.

14. The combination with a movable part and a selector adapted to impart movement thereto, said selector having a surface configured selectively to contact or to avoid contact with said part according to the angular position of the selector, a carrier on which said selector is rotatably mounted, said carrier being movable to translate said selector bodily for contact with said part, and compensating means adapted to maintain a certain portion of the surface of said selector in a fixed plane during the movement of said carrier, whereby to present continuously a given portion of the surface of said selector to said part during translation.

15. In a device of the character described, the combination with transmission mechanism having shiftable elements and a movable part connected to one of said elements for the shifting thereof, of a movable carrier, a selector adjustably mounted on said carrier and having a surface configuration adapting it in selected positions of adjustment to contact with or avoid contact with said part during the movement of said carrier, driving connections to said carrier for the movement thereof, a second set of driving connections to said selector for the adjustment thereof, and means interconnecting said connections and adapted to compensate in the position of a portion of said selector for displacement from a fixed plane during the movement of said carrier.

16. In a device of the character described, the combination with speed change transmission having shiftable elements and a movable part connected to one of said elements for the shifting thereof, of a movable carrier, a selector adjustably mounted on said carrier and having a surface configuration adapting it in selected positions of adjustment to contact with or avoid contact with said part during the movement of said carrier, driving connections to said carrier for the movement thereof, a second set of driving connections to said selector for the adjustment thereof and means interconnecting said connections and adapted to compensate in the adjustment of a portion of said selector for the displacement from a fixed plane caused during the movement of said carrier, together with a handle mounted for a plurality of independent movements in different directions respectively operatively connected with said first and second connections to transmit movement to the one or the other of said connections.

17. The combination with a speed change transmission including shiftable elements, of a shiftable part connected to one of said elements for the shifting thereof a movable carrier, a selector adjustably mounted on said carrier and having a surface configuration adapting it in selected positions of adjustment to contact with or avoid contact with said part during the movement of said carrier, driving connections to said carrier for the movement thereof, a second set of driving connections to said selector for the adjustment thereof, means interconnecting said connections and adapted to compensate in the adjustment of a portion of said selector for the displacement from a fixed plane caused during the movement of said carrier, together with a handle mounted for a plurality of independent movements in different directions of adjustment and operatively connected respectively with said first and second connections to transmit movement to the one or the other in accordance with the direction of handle movement, and an interlocking mechanism operative to restrain said handle against movement in one of said directions when it has been moved in the other.

18. The combination with a selector mounted for adjustment and a carrier supporting said selector and mounted for movement whereby to move said selector bodily in a shifting direction, of a first part connected with said carrier for movement in accordance with the movement thereof, and a second part connected with said selector for movement in accordance with the adjustment thereof, one of said parts being a cam and the other a cam follower, said cam and cam follower being adapted to interact upon the occurrences of movement of said carrier, whereby to compensate in said selector for the displacement from a fixed plane of a portion thereof occasioned by the movement of said carrier.

19. The combination with a pin mounted for shifting, of a selector therefor adjustably mounted and configured selectively to engage or to avoid contact with said pin in accordance with its position of adjustment, a movable carrier supporting said selector and adapted to impart movement through said selector to said pin when said selector is in adjustment for engagement therewith, a part connected with said carrier, a part connected with said selector, one of said parts being a cam and the other a follower therefor, said cam and follower being arranged to interact during carrier movement to produce that degree of adjustment in said selector which will compensate for the displacement from a fixed plane of a portion thereof during movement of the carrier.

20. The combination with a movable carrier and a selector mounted thereon for translative movement therewith and for selective adjustment, of a control handle, motion transmitting connections therefrom including a reciprocatory part and a rotatable part, one of said parts being connected with said carrier and the other with said selector, and compensating means interposed between said parts and adapted to adjust the one part during the movement of the other to a degree sufficient to maintain a portion of said selector in a fixed plane during the movement of said carrier.

21. The combination with a movable carrier and a selector mounted thereon for bodily movement therewith and for selective adjustment, of a control handle for said carrier and selector, a part connected with said handle to receive both rotative and reciprocative movement therefrom, motion transmitting connections operative between said part and said carrier to transmit one of said movements of said part to said carrier for the movement thereof, motion transmitting connections operatively associated with said part to transmit the other movement thereof to adjust said selector, compensating means interposed between said part and said last mentioned connections and adapted to adjust said last mentioned connections during the movement of the other connection to a degree sufficient to maintain a portion of said selector in a fixed plane during the movement of said carrier, said compensating means comprising a key and a keyway inclined with reference to the axis of rotative movement of said part.

22. The combination with a movable carrier and a selector mounted thereon for bodily movement therewith and for selective adjustment, of a control handle for said carrier and selector, a part connected with said handle to receive rotative and reciprocative movement therefrom, motion transmitting connections operative between said part and said carrier to transmit one of said movements of said part to said carrier for the movement thereof, motion transmitting connections operatively associated with said part to transmit other of said movements thereof to adjust said selector, compensating means interposed between said part and said last mentioned connections and adapted to adjust said last mentioned connections during the movement of said carrier to a degree sufficient to maintain a portion of said selector in a fixed plane during the movement of said carrier, and interlocking mechanism operatively associated with said connections and adapted to restrain said part against simultaneous rotative and reciprocative movement.

23. The combination with an oscillatory carrier and a rotatable selector mounted on said carrier for bodily translation, a pin adapted to receive movement from said selector during the oscillation of said carrier in selected positions of rotation of said selector, said selector being configured to contact with said pin in certain positions of rotative adjustment and to avoid contact with said pin in other positions of such adjustment, actuating connections for said carrier and selector comprising a handle mounted for oscillation about offset axes transverse with respect to each other, a sleeve pivoted to said handle and concentric with one of said axes of oscillation thereof, said sleeve being adapted to receive rotatable and reciprocative movement from said handle, a reciprocable part connected with said sleeve to partake of the reciprocative movement thereof and connected in operative motion-imparting relation to said carrier, a second sleeve concentric with said first mentioned sleeve and connected to impart rotative movement to said selector and a splined connection between said second sleeve and said first sleeve adapted to impart rotative movement to said second sleeve without imparting reciprocative movement thereto.

24. The combination of an oscillatory carrier and a rotatable selector mounted on said carrier for bodily translation, a pin adapted to receive movement from said selector during the oscillation of said carrier in selected positions of rotation of said selector, said selector being configured to contact with said pin in certain positions of rotative adjustment and to avoid contact with said pin in other positions of such adjustment, actuating connections for said carrier and selector comprising a handle mounted for oscillation about offset axes transverse with respect to each other, a sleeve pivoted to said handle and concentric with one of said axes of oscillation thereof, said sleeve being adapted to receive rotatable and reciprocative movement from said handle, a reciprocable part connected with said sleeve to partake of the reciprocative movement thereof and connected in operative motion-imparting relation to said carrier, a second sleeve concentric with said first mentioned sleeve and connected to impart rotative movement to said selector upon said carrier, and a splined connection between said second sleeve and said first sleeve adapted to impart rotative movement to said second sleeve without imparting reciprocative movement thereof, said splined connection including a key secured to one of said sleeves and a keyway in the other of said sleeves inclined with respect to the axis thereof, whereby a limited degree of rotative movement will be transmitted to said second sleeve during the reciprocation of said first sleeve.

25. The combination with change speed mechanism including shiftable elements and a reciprocable pin connected with one of said elements for the shifting thereof, of a carrier mounted for oscillation in a shifting direction, a selector rotatably mounted on said carrier for bodily translation therewith and selectively adjustable about its own axis alternatively to contact or avoid contact with said pin, said selector being provided with recesses adapted in certain positions to receive said pin and having an unrecessed portion of its surface for contact with said pin, a sleeve shaft mounted for rotation and reciprocation, a handle mounted for rotation about the axis of said shaft and coupled thereto, said handle being pivoted for movement about an axis transverse with respect to that of said shaft in a direction to produce reciprocation thereof, a reciprocable member confined against rotation and secured to said shaft for reciprocation therewith, gearing interconnecting said member with said carrier and adapted operatively to produce oscillation of said carrier in accordance with reciprocation of said sleeve shaft and member, gearing operatively connected to said selector for the rotative adjustment thereof in a selective direction and including a hub member concentric with said sleeve shaft, a keyway in said sleeve shaft inclined with reference to the axis thereof, and a key connected with said hub member and fitted to said keyway, whereby to be adapted to receive rotative but not reciprocative movement from said sleeve shaft and to receive a slight degree of rotative movement from said sleeve shaft during the reciprocation thereof.

26. The combination with a change speed transmission including shiftable elements and a reciprocable pin connected with one of said elements for the shifting thereof, of a carrier mounted for oscillation in a shifting direction, a selector rotatably mounted in said carrier for bodily translation therewith and selectively adjustable about its own axis alternatively to contact or avoid contact with said pin, said selector being provided with recesses adapted in certain positions to receive said pin and having an unrecessed portion of its surface for contact with said pin, a sleeve shaft mounted for rotation and reciprocation, a handle mounted for rotation about the axis of said shaft and coupled thereto, said handle being pivoted for movement about an axis transverse with respect to that of said shaft in a direction to produce reciprocation thereof, a reciprocable member confined against rotation and secured to said shaft for reciprocation therewith, gearing interconnecting said member with said carrier and adapted operatively to produce oscillation of said carrier in accordance with reciprocation of said sleeve shaft and member, gearing operatively connected to said selector for the rotative adjustment thereof in a selective direction and including a hub member concentric with said sleeve shaft, a keyway in said sleeve shaft inclined with reference to the axis thereof, a key connected with said hub member and fitted to said keyway, whereby to be adapted to receive rotative but not reciprocative movement from said sleeve shaft and to receive a slight degree of rotative movement from said sleeve shaft during the reciprocation thereof, an interlocking part connected with said hub member, an interlocking part connected with said carrier, and a third interlocking part alternatively adjustable for engagement with the one or the other of said first mentioned parts and adapted to secure either against operation when the other has previously been actuated.

27. A machine tool including a column, parallel shafts rotatably supported therefrom, gearing within said column connecting said shafts and shiftable to change the rate of one of said shafts, said column having a wall in a plane substantially parallel with said shafts, a selector and a shifter supported from said wall on the inner side thereof and adjacent said gearing, said selector being movable to positions predeterminative of the effect of said shifter and said shifter being movable to shift some of said gearing in accordance with the position of said selector, a lever supported from the other side of said wall for movement about a pivot vertical to the plane thereof and for other movement, a mechanical train connecting said lever for movement about said pivot to move said selector, another train connecting said lever for the other movement thereof to move said shifter, and an index chart associated with said wall in a position for a part movable with said lever to act as a pointer indicating different divisions of said chart during lever movement about said pivot.

JOSEPH B. ARMITAGE.
    FRED A. PARSONS.